US008677279B2

(12) United States Patent
Gan et al.

(10) Patent No.: US 8,677,279 B2
(45) Date of Patent: Mar. 18, 2014

(54) VISUAL HIERARCHY EXPLORER (75) Inventors: Jeff Gan, Vancouver (CA); Finlay Cannon, Vancouver (CA); Ronald Wade Richards, Vancouver (CA)

(73) Assignee: Business Objects Software Limited, Dublin (IE)

( * ) Notice: Subject to any disclaimer, the term of this patent is extended or adjusted under 35 U.S.C. 154(b) by 589 days.

(21) Appl. No.: 12/436,151

(22) Filed: May 6, 2009

(65) Prior Publication Data
US 2010/0287512 A1 Nov. 11, 2010

(51) Int. Cl.
*G06F 3/048* (2013.01)
(52) U.S. Cl.
USPC ............................ 715/854; 715/853; 715/764
(58) Field of Classification Search
USPC .......................................................... 715/854
See application file for complete search history.

(56) References Cited

U.S. PATENT DOCUMENTS

| | | | | |
|---|---|---|---|---|
| 5,414,809 A * | 5/1995 | Hogan et al. | .................. | 715/765 |
| 5,590,250 A | 12/1996 | Lamping et al. | | |
| 6,167,396 A | 12/2000 | Lokken | | |
| 6,496,208 B1 * | 12/2002 | Bernhardt et al. | ............ | 715/853 |
| 6,901,555 B2 | 5/2005 | Hida et al. | | |
| 7,107,550 B2 * | 9/2006 | Newman | ....................... | 715/853 |
| 7,703,045 B1 * | 4/2010 | Kawahara et al. | ............ | 715/853 |
| 2003/0085931 A1 * | 5/2003 | Card et al. | ..................... | 345/853 |
| 2004/0169688 A1 * | 9/2004 | Burdick et al. | ............... | 345/854 |
| 2006/0288311 A1 * | 12/2006 | Heer et al. | ..................... | 715/853 |
| 2007/0294038 A1 * | 12/2007 | Landau et al. | .................. | 702/20 |
| 2009/0100086 A1 | 4/2009 | Dumant et al. | | |
| 2009/0187864 A1 * | 7/2009 | Bedell et al. | ................... | 715/854 |
| 2010/0070904 A1 * | 3/2010 | Zigon et al. | .................... | 715/771 |
| 2010/0185382 A1 * | 7/2010 | Barker et al. | ................. | 701/119 |

FOREIGN PATENT DOCUMENTS

EP    1 217 555 A2    6/2002

OTHER PUBLICATIONS

Paint Shop Pro 7.01. Jasc Software, Inc. Feb. 2001, screenshots from working program, pp. 1-5.*
Mustafa Sanver, Interactive Visual Exploration of Large Relation Data, Apr. 2008.*
European Search Report for EP Application No.: 10162221.5, mailed on May 2, 2011, 6 pages.
Catherine Plaisant et al.; SpaceTree: Supporting Exploration in Large Node Link Tree, Design Evolution and Empirical Evaluation; Proceedings of the IEEE Symposium on Information Visualization (InfoVis'02); 2002; USA; 8 pages (http://portal.acm.org/citation.cfm?id=857752).

(Continued)

*Primary Examiner* — Matt Kim
*Assistant Examiner* — Mahelet Shiberou (57) ABSTRACT

A method and a system are described that involve generating a graphical tree hierarchy of a data structure and its accompanying metadata. In one embodiment, the method includes building a graphical tree hierarchy with a plurality of levels, wherein the graphical tree hierarchy includes at least a root node, a plurality of non-leaf nodes, and a plurality of leaf nodes. Further, the method includes aggregating at least a portion of the plurality of non-leaf nodes at a level of the graphical tree hierarchy, if a subset of the plurality of non-leaf nodes residing at the level exceeds a maximum number of nodes per the level. The method also includes scaling down the plurality of leaf nodes, if the plurality of levels of the graphical tree hierarchy exceeds a maximum number of levels.

23 Claims, 7 Drawing Sheets

(56) References Cited

OTHER PUBLICATIONS

ProClarity Corporation; ProClarity Analytics Server—Product Overview; 2002—ProClarity Corporation, Boise, Idaho (USA): (http://www.datasmart.ch/Download/pas.pdf).

Business Objects S.A.; Exploration trees, 2007-2008—Business Objects S.A.—Paris (France) (http://www.sdn.sap.com/irj/boc/innovation-center;jsessionid=
(J2EE3417500)ID0-
637863350DB01985134929751900954End?rid=/webcontent/uuid/a09462a0-7c98-2b10-fb97-c20d7e6d1aff).

Svetlana Mansmann and Marc H. Scholl; Exploring OLAP Aggregates with Hierarchical Visualization Techniques, Proceedings of the 2007 ACM Symposium on Applied Computing, pp. 1067-1073, 2007 (http://www.inf.uni-konstanz.de/dbis/members/mansmann/files/45.pdf).

Svetlana Vinnik and Florian Mansmann; From Analysis to Interactive Exploration: Building Visual Hierarchies from OLAP Cubes; 10th International Conference on Extending Database Technology, 2006 vol. 3896, pp. 496-514 (http://infovis.uni-konstanz.de/papers/2006/edbt2006.pdf).

Ernst Kleiberg et al.; Botanical Visualization of Huge Hierarchies; Proceedings of the IEEE Symposium on Information Visualization 2001 (INFOVIS'01), 2001, pp. 87-94 (http://www.win.tue.nl/~vanwijk/botatree.pdf).

Hideki Koike and Hirotaka Yoshihara; Fractal Approaches for Visualizing Huge Hierarchies, Proceedings of the 1993 IEEE Symposium on Visual Languages, 1993, pp. 55-60 (http://www.vogue.is.uec.ac.jp/~koike/papers/vl93/vl93.pdf).

John Lamping and Ramana Rao; Visualizing large trees using the hyperbolic browser; Conference on Human Factors in Computing Systems, Conference Companion on Human Factors in Computing Systems: Common Ground ; pp. 388-389, 1996 (http://www.sigchi.org/chi96/proceedings/videos/Lamping/hb-video.html).

John Lamping and Ramana Rao; Laying Out and Visualizing Large Trees Using a Hyperbolic Space; Proceedings of the 7th annual ACM symposium on User interface software and technology, pp. 13-14, 1994 (http://www2.parc.com/csl/groups/sda/publications/papers/Lamping-UIST94/for-web.pdf).

Ramana Rao and Stuart K. Card; The Table Lens: Merging Graphical and Symbolic Representations in an Interactive Focus+Context Visualization for Tabular Information, Proceedings of the SIGCHI conference on Human factors in computing systems: celebrating interdependence, 1994, pp. 318-322 (http://www.ramanarao.com/papers/tablelens-chi94.pdf).

Nakisa Inc.; Nakisa OrgChart; 2008—Nakisa Inc.; Montreal, Quebec (Canada); (http://www.nakisa.com/a-pdfs/datasheets/Datasheet-Nakisa_OrgChart-Aug2008.pdf).

Nakisa Inc.; Nakisa OrgModeler, 2008—Nakisa Inc.; Montreal, Quebec (Canada); (http://www.nakisa.com/a-pdfs/datasheets/Datasheet-Nakisa_OrgModeler-Aug2008.pdf).

Andreas S. Maniatis; The Case for Mobile OLAP; Current trends in database technology—EDBT 2004 workshop, vol. 3268, pp. 405-414 (http://www.dblab.ntua.gr/pubs/uploads/TR-2004-11.pdf).

Michael Friendly and D. J. Denis, (2001). Milestones in the history of thematic cartography, statistical graphics, and data visualization; (http://www.math.yorku.ca/SCS/Gallery/milestone/).

Aaron M. Ellison; "Explorartory Data Analysis and Graphic display"; pp. 37, in Design and analysis of ecological experiments, Ed. 2, published by Oxford University Press Inc., 2001, (http://www.amazon.com/Design-Analysis-Ecological-Experiments-Scheiner/dp/0195131886#reader).

\* cited by examiner

FIGURE 5

VISUAL HIERARCHY EXPLORER

FIELD OF INVENTION

Embodiments of the invention relate generally to the software arts, and, more specifically, to a visualization for a hierarchical data structure that provides a user the ability to explore the data and quickly determine the shape and content of the data structure.

BACKGROUND

In the field of computing, one can browse tree structures and may need these to be displayed in a graphical user interface (GUI). Trees are used to implement file systems via computer programs, such as a file manager or a file browser that may provide a user an interface to work with the file systems. The most common operations that the file manager performs on files are create, open, edit, view, rename, move, and so on. The files are typically displayed in a hierarchy, which can be presented as a tree data structure. The tree data structure is an acyclic connected graph, where each node has a set of zero or more children nodes, and at most one parent node. A graph may be defined by its nodes, collectively denoted V for vertices, and its edges collectively denoted E. A graph G is then defined as G=(V, E). A graph is considered connected because all nodes are coupled through direct connections or indirect connections. All nodes have one parent except the root node that has zero parents. A graph is acyclic as no traversal along the edges returns to the starting node. One can form a sub-tree from a node, N, in the tree by deleting the edge from N to its parent, and considering the nodes which remain connected (directly or indirectly) to N. There are various ways of visually representing tree data structures. Generally, they are variations or combinations of a few basic styles: 1) classical node-linked diagrams that are connected with line segments; 2) nested sets that use containment to show parenthood; 3) layered diagrams that use alignment; 4) diagrams that use indentation (or outlines), such as eXtensible Markup Language (XML) files; and 5) nested parentheses, e.g., ((employee, manager) team) company. Trees are used in depicting the content of multi-dimensional data sources, Also known as OnLine Analytical Processing (OLAP) data source, the user interface and the data sources, collectively OLAP tools are commercially available, for example, SAP® BusinessObjects™ Voyager, available from SAP AG. OLAP tools include functionality for report generation, data exploration and are otherwise suited to ad hoc analyses. OLAP generally refers to a technique of providing fast analysis of shared multidimensional information stored in a database. The OLAP systems provide a multidimensional conceptual view of data, including full support for hierarchies and multiple hierarchies. This framework is used because it is a logical way to analyze businesses, organizations and otherwise engage in business intelligence activities. These hierarchies are trees.

It can be inefficient and time consuming to browse large hierarchical data structures via standard browsers. A user faced with an unfamiliar large hierarchy for the first time is forced to start drilling into the structure from top to bottom until the desired nodes are found. "Drilling in" in a data structure refers to focusing on a particular sub-tree, temporarily ignoring the nodes that are not part of that sub-tree. It can include displaying data in the sub-tree not previously displayed before focusing on the sub-tree. "Drilling out" in a tree data structure refers to expanding the set of nodes that are being examined by including the parent and sibling nodes of the sub-tree that is currently being examined. Drilling in the data structure is a slow process that requires a lot of time, user attention, and user selection of nodes. The main drawback is that the user is not able to see the "big picture" of the data structure during exploration and is uncertain which branch of the tree to follow. Often times, the leaf nodes at the lowest level in the data structures represent the most important data. The user has to navigate in the large tree structure to find these leaf nodes and could easily lose context of where he or she is in the tree.

SUMMARY

A method and a system that involve generating a graphical tree hierarchy of a data structure and its accompanying metadata are described. In one embodiment, the method includes building a graphical tree hierarchy with a plurality of levels, wherein the graphical tree hierarchy includes at least a root node, a plurality of non-leaf nodes, and a plurality of leaf nodes. The graphical tree hierarchy represents a data structure, wherein the data structure is stored in a database storage unit. The root node, the plurality of non-leaf nodes, and the plurality of leaf nodes provide metadata information. Further, the method includes aggregating at least a portion of the plurality of non-leaf nodes at a level of the graphical tree hierarchy, if a subset of the plurality of non-leaf nodes residing at the level exceeds a maximum number of nodes per the level. The method also includes scaling down the plurality of leaf nodes and the plurality of non-leaf nodes, if the plurality of levels of the graphical tree hierarchy exceeds a maximum number of levels. Finally, the graphical tree hierarchy is displayed in a predefined GUI region, the displayed graphical tree is associated with the data structure and accompanying metadata.

In one embodiment, the system includes a GUI region with predefined parameters and a hierarchal data structure stored in a database storage unit. The system further includes a graphical tree structure with a plurality of hierarchal levels including at least a root node, a plurality of non-leaf nodes, and a plurality of leaf nodes, wherein at least a portion of the plurality of non-leaf nodes is aggregated if a subset of the plurality of non-leaf nodes residing at a level of the tree exceeds a maximum number of non-leaf nodes per that level. The plurality of leaf nodes is scaled down if the levels of the tree exceed a maximum number of levels. The graphical tree is a visual representation of the hierarchal data structure displayed in the GUI region. Finally, the system includes a set of GUI elements to navigate in the graphical tree structure and to retrieve information about the root node, the plurality of non-leaf nodes, and the plurality of leaf nodes.

BRIEF DESCRIPTION OF FIGURES

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of the invention relate to a graphical representation of a tree structure that provides a user the ability to quickly determine the shape and the content of the tree. The shape suggests whether the tree structure is balanced or unbalanced, sparse or dense. The content refers to the name and attributes of each node in the tree structure. The tree describes the parent-child relationships in the structure and also provides summary information at each level of the tree. In an embodiment, the graphical representation of the tree structure, or similar hierarchy, can be displayed and browsed via a Visual Hierarchy Explorer (VHE). The VHE enables a user to select a particular tree node and to zoom in and out of specific tree nodes, and thus to navigate in the tree. Further, the VHE may adapt its display area to maintain an overview of the entire tree or sub-tree structure that a user has selected. This may be performed by aggregating and scaling individual tree nodes. For example, when the tree is too wide, the VHE uses aggregation nodes to reduce the overall width; when the tree is too tall, the VHE scales the leaf nodes at the lowest level of the structure to reduce the overall height. The user may change the size of the displayed tree structure by resizing the VHE screen area.

Figure 1A:
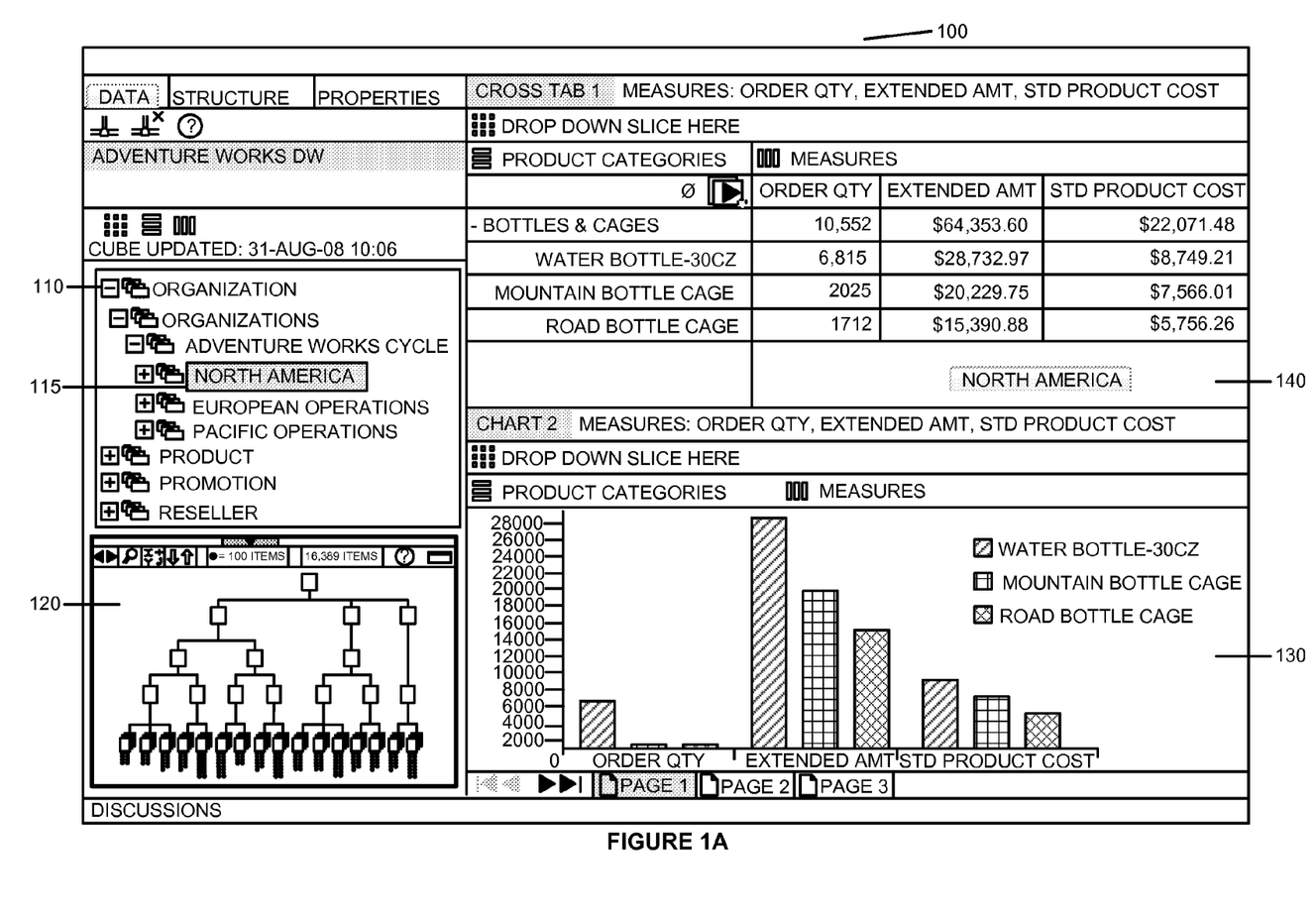
FIG. 1A is a screenshot of an exemplary business application that contains a Visual Hierarchy Explorer.

FIG. 1A is a screenshot of an exemplary business application that contains a Visual Hierarchy Explorer. Screenshot 100 presents a graphical user interface (GUI) that includes several screen areas. Screen area 110 shows a textual representation of the hierarchical structure of the global application data from a business application. GUI element 120 is the VHE that represents graphically a selected portion 115 of the data structure shown in screen area 110. Screen region 130 shows a chart in accordance with the selected data structure and the functions of the application. Screen region 140 displays additional information in accordance with the selected data structure and the functions of the application. The information displayed in screen regions 130 and 140 may or may not be related to the information displayed in the VHE 120. The VHE 120 may be implemented in any part of the GUI of the application and sizably customized according to the needs of the user and the application.

It should be appreciated that the VHE 120 may be integrated in various systems, business scenarios, and applications including, but not limited to, OLAP tools, business intelligence tools, data modeling tools, database applications, file systems, and so on.

Figure 1B:
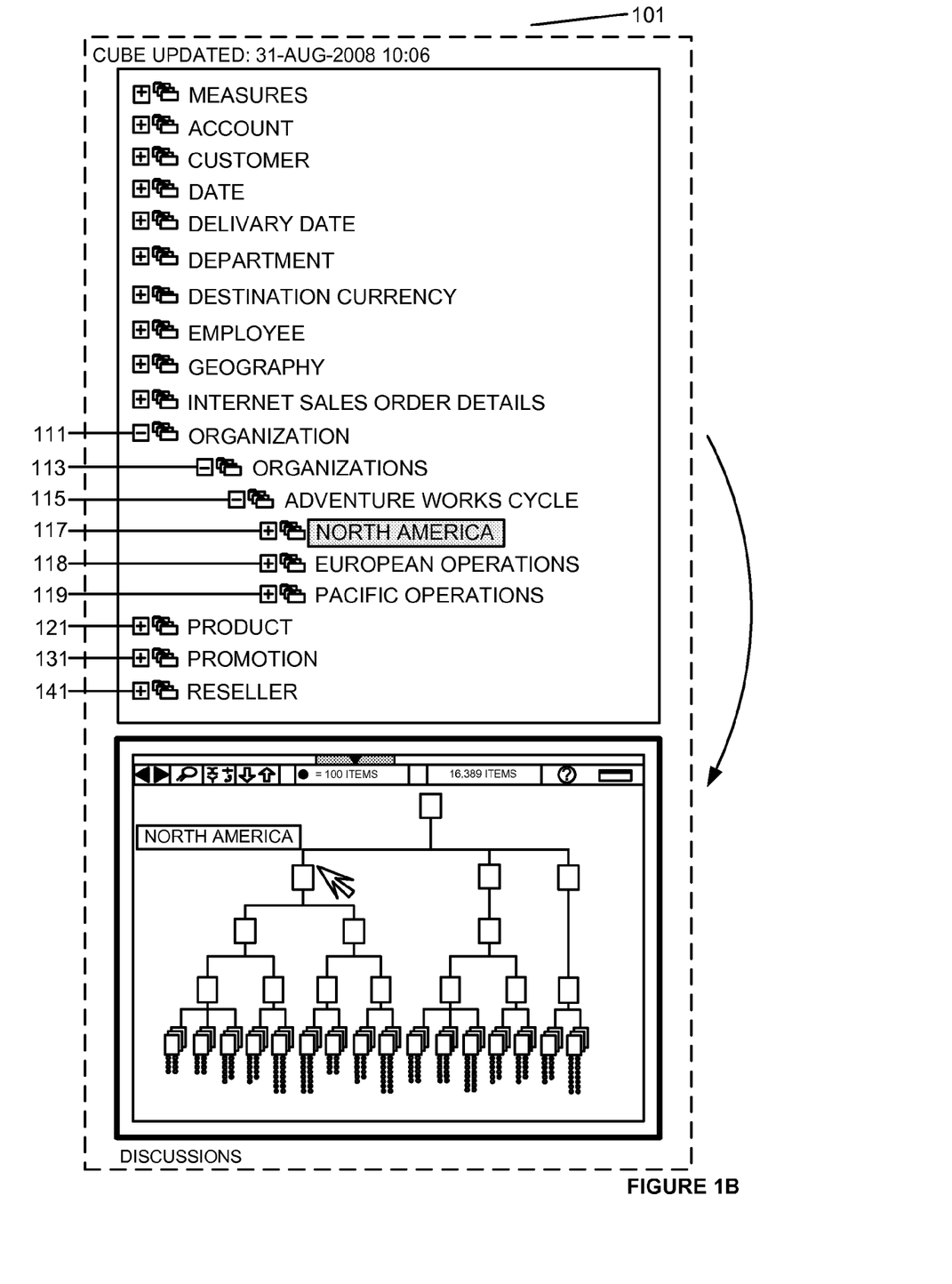
FIG. 1B is a screenshot of a data structure and a Visual Hierarchy Explorer representing the data structure.

FIG. 1B is a screenshot of a data structure and a Visual Hierarchy Explorer representing the data structure. Screenshot 101 represents a portion of screen area 110 and the VHE 120 of screenshot 100. As discussed above with relevance to FIG. 1A, VHE 120 shows a graphical representation of a selected portion of the data structure shown in screen area 110. Screen area 110 shows a data structure that includes several parent nodes: Organization 111, Product 121, Promotion 131, and Reseller 141. Each of these nodes may have one or more child nodes, and each of the child nodes may have one or more sub-nodes. For example, Organization 111 contains Organizations 113 child node. Organization 113 contains AdventureWorks Cycle 115 child node, which includes three sub-nodes: North America 117, European Operations 118, and Pacific Operations 119. Therefore, the data structure is a hierarchal tree structure, wherein each node may contain a set of sub-nodes.

In an embodiment, the VHE 120 may correspond to the entire tree data structure, displaying all nodes and sub-nodes. In another embodiment, the VHE 120 may display a particular portion of the data structure, selected by a user. In screenshot 101 comprising screen areas 110 and 120, North America 117 child node of AdventureWorks Cycle 115 is selected. The VHE 120 displays a tree data structure that corresponds to the sub-structure of the AdventureWorks Cycle 115 node. The displayed tree structure includes a root node (AdventureWorks Cycle 115) and three sub-nodes (North America 117, European Operations 118, and Pacific Operations 119). The selected North America 117 sub-node includes two child nodes, which include their own sub-nodes, which further include other sub-nodes, and so on till the end of the tree structure. Thus, a consolidation of the entire AdventureWorks Cycle 115 sub-tree structure is displayed within the VHE 120. This is done by aggregating and scaling individual nodes.

Figure 2:
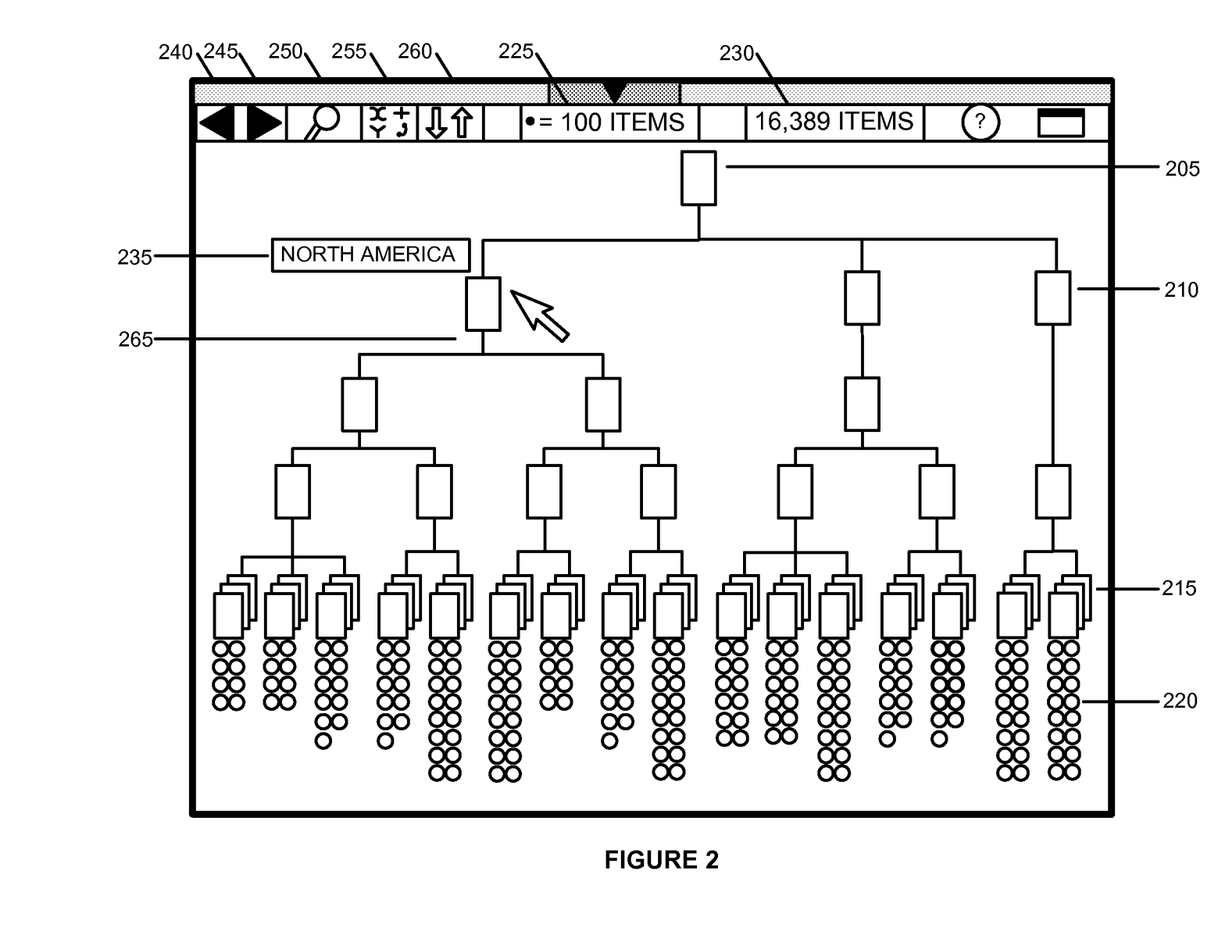
FIG. 2 is an embodiment of a Visual Hierarchy Explorer.

FIG. 2 is an embodiment of a Visual Hierarchy Explorer. VHE 120 includes not only a graphical representation of a tree data structure, but also several additional features that enables a user to navigate and browse the displayed data structure. The tree structure includes a root node 205 and one or more non-leaf nodes 210 that are child nodes of the root parent node 205. The tree structure can include one or more levels of non-leaf nodes that are decedents of the root node 205. Further, the tree structure includes aggregation nodes 215. The aggregation nodes are used to reduce the height or the width of the tree structure, so the entire tree could be displayed in the VHE screen area 120. Each aggregation node 215 includes a number of leaf nodes and these are depicted by leaf node icons 220. The leaf nodes are a representation of one or more leaf nodes in the data structure. Each leaf node icon 220 may represent multiple leaf nodes. Plotted against the bottom level of the tree structure, the arrangement of leaf node icons 220 creates an inverted histogram. The aggregate nodes 215 are the bins and the leaf node icons 220 the count measure. This representation lets a user compare leaf node frequencies and lets the user see with a single glance where leaf nodes are concentrated even for ragged/unbalanced trees. The circles (icons) could be replaced with squares, bars that span the bin, and the like.

VHE 120 includes a scale field 225 that indicates how many actual leaf nodes are represented by a single leaf node icon 220. For example, "=100 items" means that each leaf node icon 220 represents 100 leaf nodes. Further, VHE 120 includes a total items field 230 that indicates the total number of nodes in the entire current tree structure. For example, "16,389 items" corresponds to 16,389 actual tree nodes. Tooltips are built into the VHE 120 to provide detailed node information. Tooltip 235 shows the name of a particular tree node, when placing the mouse pointer over that node. Placing the mouse pointer over an aggregation node 215, will display a tooltip with the following information in the aggregation: "<first node name> . . . <last node name> (<total count of items>)". For example, "Advertising . . . Marketing (250 items)".

A user can interact with the VHE 120 using the features provided with the tool. Back button 240 enables the user to go back to a previous zoom level. Forward button 245 enables the user to go to a next zoom level. Zoom in/out 250 enables the user to zoom in and zoom out of a specific aggregation node. If the user is equipped with a mouse with a scroll wheel, then scroll up corresponds to zoom in and scroll down corresponds to zoom out. Zooming is equivalent to "focus-drilling" on the hierarchy node. This means that when an aggregation node is zoomed into, the VHE 120 makes the immediate parent of the aggregation node the new root node and renders the rest of the sub-tree starting from that root node. The new root node is labeled. If the sub-tree is still larger than the available screen area, then aggregation is performed again at the bottom level zooming is again possible.

The VHE 120 may include a vertical/horizontal orientation 255 feature. The vertical/horizontal orientation 255 enables the user to toggle between vertical and horizontal tree display of the data structure. The default orientation is vertical. Further, the VHE 120 may include a link/unlink 260 feature that enables the user to link or unlink a selected node in the VHE 120 to a related data exploration tool that could provide additional information about the selected node. For example, information about the selected North America 117 node in the VHE 120, could be displayed as related visualizations in the screen regions 130 and 140 (FIG. 1A), if the VHE 120 is linked to the related data exploration tool such as a global data explorer. Also, the VHE 120 enables the user to select or deselect a particular node by clicking on it via the select/deselect 265 feature. Multiple selections may also be supported, such as double click, sticky click, drag-and-lasso, and so on. The selected nodes are rendered in a different color than the non-selected nodes. Using the supported features of the VHE 120, the user may select a tree node, view information about the node, and browse in the tree structure while the tree representation is displayed in the available screen area. Moreover, the user can obtain the shape of the tree and the number of nodes included therein.

A tree representation of the data structure can be built from an algorithm for generating a graphical image and its accompanying metadata. In one embodiment, the metadata represents an XML image map containing x and y coordinates that indicate which areas of the graphic are user-selectable (e.g., by clicking), as well as textual tooltip information for each node. The algorithm may accept the following input request parameters: 1) rootNode—specifies the root node of the tree structure; 2) width—specifies the width of the graphic in pixels; 3) height (in pixels)—specifies the height of the graphic in pixels; and 4) orientation—specifies the orientation of the tree (vertical or horizontal). The algorithm starts at the top of the tree, performs a tree-walk (e.g., left-to-right and top-to-bottom) aggregating nodes horizontally if a node level does not fit in the specified width, and stopping and scaling leaf nodes vertically if the remaining space at the bottom does not fit in the specified height. This algorithm may create all the needed data, which can be rendered by standard techniques on the user display. The design of the VHE may support client-side rendering, resizing, and tool-tipping using some Web design technology, such as JavaScript, Adobe Flash, and so on.

The algorithm for generating the graphical image and its metadata is flexible and may handle unbalanced tree structures. It can also process tree nodes that are modeled using single or multiple entities. For example, nodes for geographical hierarchy are typically modeled and connected using Country, State, and City entities. Nodes for organization chart hierarchy are modeled using a single Employee entity, where each employee may be linked to one manger and one or more subordinates.

Figure 3A:
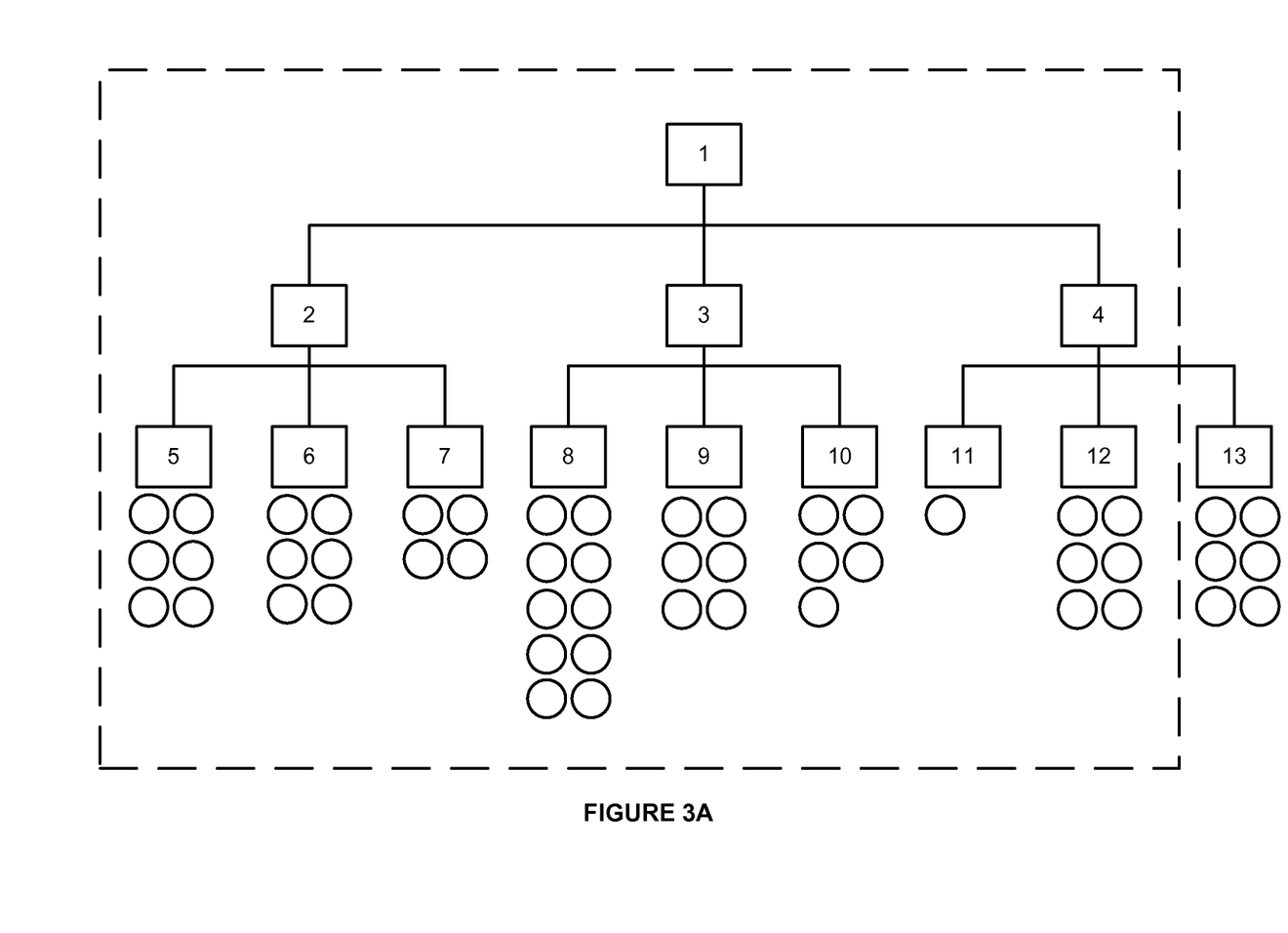
FIG. 3A is a diagram of a first step of the method for generating a graphical image of a data structure and its accompanying metadata.

FIG. 3A is a diagram of a first step of the algorithm for generating a graphical image and its accompanying metadata. The graphical image may present a tree hierarchy structure that contains a root node, a plurality of branches (i.e. non-leaf nodes), and a plurality of sub-branches that do not include a hierarchy element beneath (i.e., leaf nodes.) First, the root node of the tree is built and added to the graphic image. The root node is added at a first level. To build the non-leaf nodes of the tree hierarchy, the selected data structure is walked through left-to-right, top-to-bottom, and level by level. The walk-through stops when there is not enough space in the provided window, either vertically or horizontally. All child nodes that are non-leaf nodes are built and added to the graphic image, the metadata is populated for each child node, and each child node is attached to the corresponding parent node.

FIG. 3A shows a simple tree structure, which has more nodes than can fit in the provided window (specified by the width and height parameters). In an embodiment, the nodes that do not fit in the provided window may come out from the left or right side of the window frame. In this case, the tree structure has to be scaled down horizontally. In an alternative embodiment, the nodes that do not fit may come out from the bottom of the window frame. In this case, the tree structure has to be scaled down vertically. The tree structure shown in FIG. 3A contains nodes that come out from the right side of the window. The algorithm walk-through process stopped at node 13 of the tree structure, because there was not sufficient horizontal space available. If there are nodes that do not fit in the window space, the algorithm continues with aggregation of the non-leaf nodes at the level the nodes come out of the frame. For example, level 3.

Figure 3B:
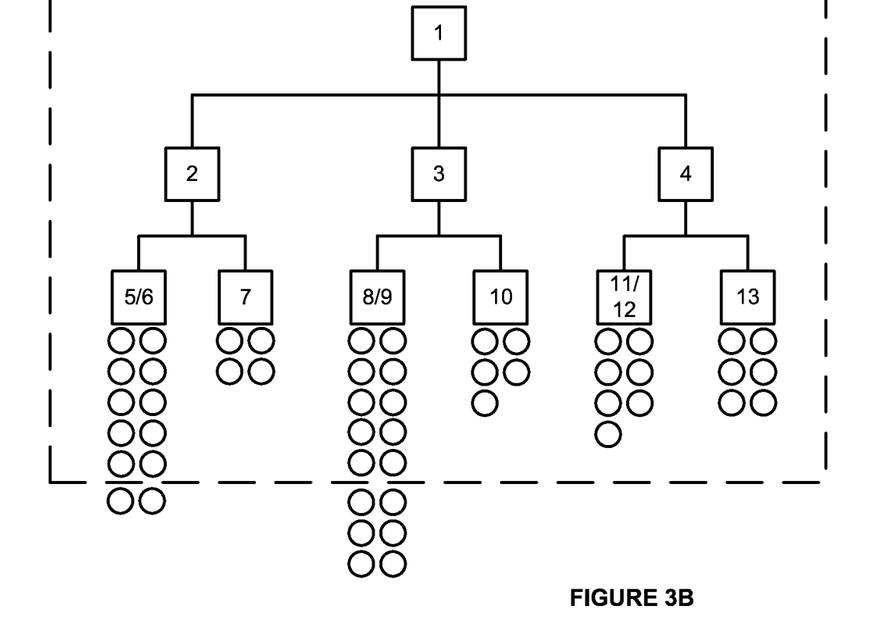
FIG. 3B is a diagram of a second step of the method for generating a graphical image of a data structure and its accompanying metadata.

FIG. 3B is a diagram of a second step of an algorithm for generating a graphical image and its accompanying metadata. The second step of the algorithm aggregates non-leaf nodes at a level they do not fit in the provided window space. For example, node 13 and its sub-nodes do not fit in the window space; node 13 is located at level 3 of the tree structure. Therefore, the non-leaf nodes of level 3 have to be aggregated so that all non-leaf nodes at level 3 fit in the window space. The algorithm includes aggregating two non-leaf nodes that share the same parent node into one aggregated node. For example, aggregating non-leaf nodes 5 and 6. If the two non-leaf nodes do not share the same parent node, they cannot be aggregated. For example, non-leaf nodes 7 and 8. In this case, nodes 5 and 6 are aggregated into one node by combining their leaf nodes and node 7 remains the same. This is done for all non-leaf nodes at the particular level (e.g., level 3). After the aggregation process, some space in the provided window is available. The algorithm continues the walk-through process until there are no non-leaf nodes left or the window space is full. FIG. 3B shows the result of the aggregation. If there are non-leaf nodes that do not fit in the window space, the aggregation may be repeated until all non-leaf nodes of the tree structure fit horizontally in the window.

Due to the aggregation, some of the newly created aggregated nodes (e.g., node 5/6) may have increased their length and thus may not fit in the window space anymore, (e.g., consolidation of 5/6 causes vertical overflow of the display space). The algorithm continues with the next step of building the leaf nodes.

Figure 3C:
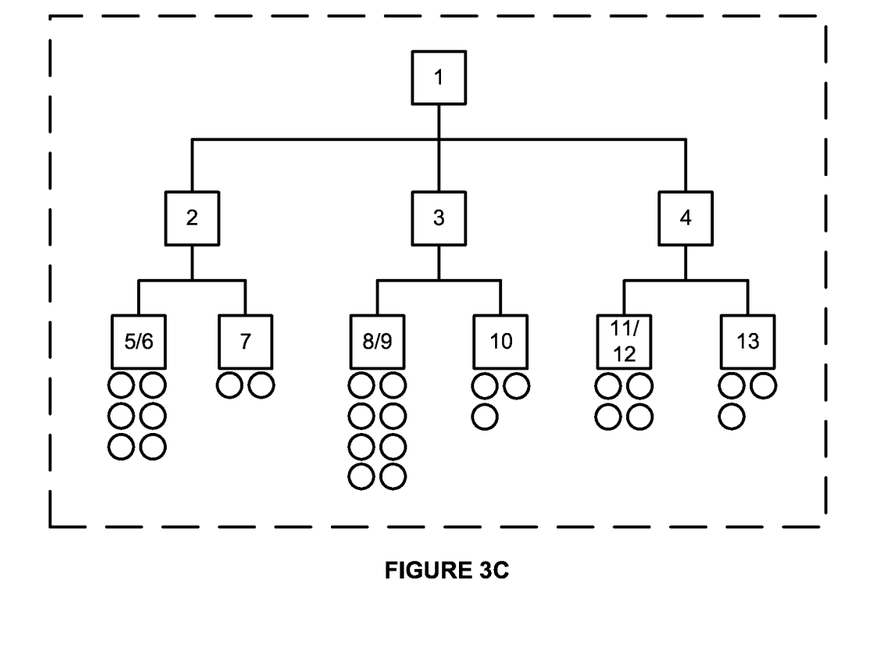
FIG. 3C is a diagram of a third step of the method for generating a graphical image of a data structure and its accompanying metadata.

FIG. 3C is a diagram of a third step of an algorithm for generating a graphical image and its accompanying metadata. The third step of the algorithm scales the leaf nodes of the aggregated nodes to fit in the provided window space. A max_leaf_per_node parameter may be specified based on the remaining space left at the bottom of the tree. This parameter defines the maximum allowed number of leaf nodes in an aggregated node icon. The algorithm computes the aggregated node with the most leaf nodes underneath (e.g., aggregated node 8/9, which has 16 leaf nodes). Then, the scaling may be calculated based on the max_leaf_per_node and the number of leaf nodes contained in the largest aggregated node max_leaf_count, in the following way: scale=max_leaf_count/max_leaf_per_node, and the result may optionally be rounded up to the nearest whole number. For example, scale=16/10=1.6, which rounded to the nearest number is 2. For each aggregate node with N leaf nodes is scaled to [N/scale]–number divided by scale and round up to nearest whole number. This means that every two leaf nodes will be consolidated into one leaf node icon and thus, aggregated node 5/6 will have 6 leaf node icons instead of 12. For an odd number of leaf nodes such as aggregated node 10 with 5 will have 3 leaf nodes. This scaling is performed for all leaf nodes. FIG. 3C shows the result from the scaling. If there still are leaf nodes that do not fit in the window space, the scaling may be repeated until all leaf node icons of the tree structure fit in the window.

It should be noted that the aggregation and the scaling depend entirely on the data structure and the provided window space. In some embodiments, if the tree structure fits in the window space after the aggregation, aggregation alone may be sufficient to fit the hierarchy into the designated window. In other embodiments, scaling of the leaf nodes alone may be sufficient if the tree structure initially fits horizontally in the provided window space. The number of aggregation steps or scaling steps also depends on the data structure and the provided window space. The final result from the algorithm should be a graphic image that shows all levels of a selected tree data structure and provides information about the shape and content of the tree structure itself.

Figure 4:
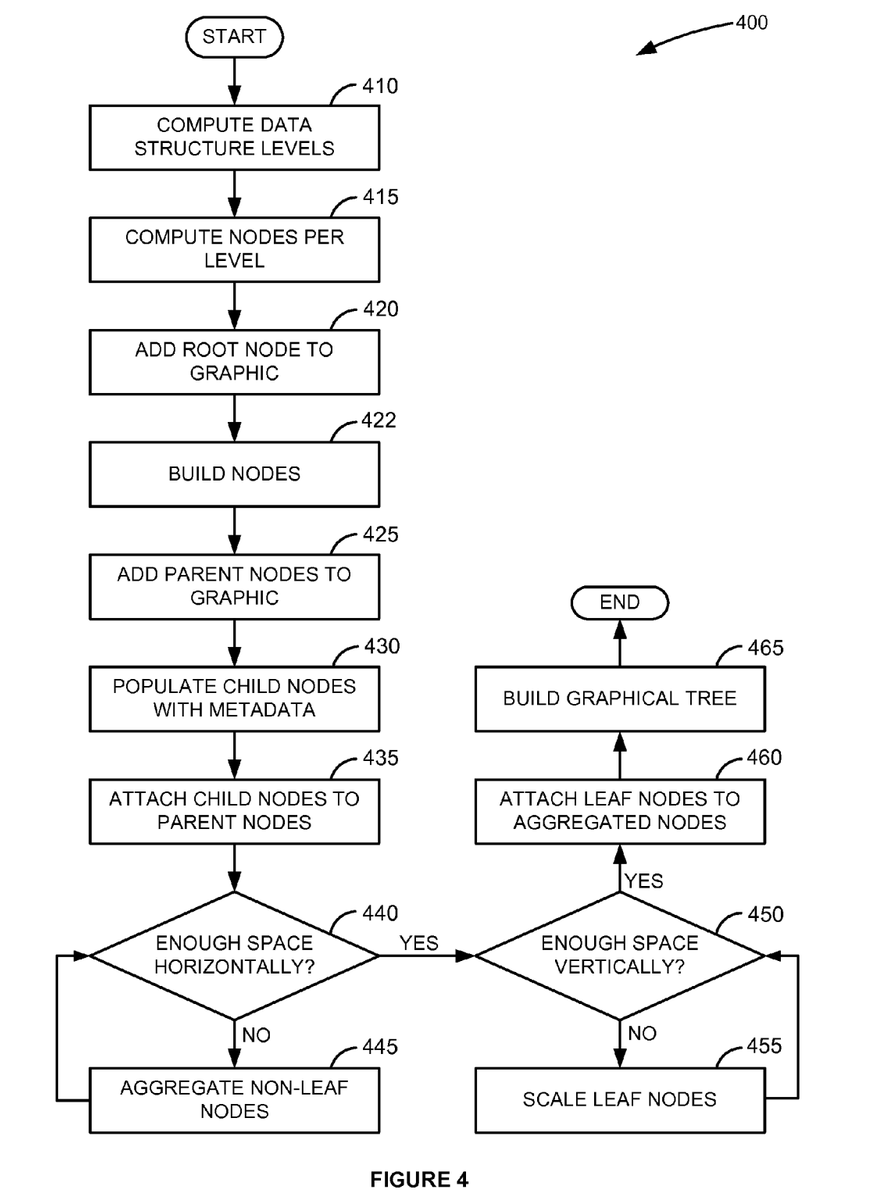
FIG. 4 is a flow diagram of an embodiment of the process for generating a graphical image of a data structure and its accompanying metadata.

FIG. 4 is a flow diagram of an embodiment of the process for generating a graphical image of a data structure and its accompanying metadata. Process 400 follows the algorithm described with reference to FIGS. 3A, 3B, and 3C. Process 400 aims to generate a visual representation of a hierarchal data structure, such as a graphical tree, that shows the entire data structure including the node at the lowest level. The data structure may be an independent data structure or a portion of a larger data structure. The graphical tree structure may be displayed in a GUI element, which may be defined by a user with particular height and width parameters. At block 410, the maximum levels of the graphical tree, representing the data structure, are computed in accordance with the height of the provided GUI element (e.g., window). At block 415, the maximum number of nodes per each level in the graphical tree structure is computed. In this way, the maximum width and height of the tree is defined in the window space provided.

The root node of the data structure is defined and added as a root node to the visual representation of the data structure, i.e. graphical tree, at block 420. At block 422, leaf nodes and non-leaf nodes are built. The method for generating a graphical tree structure can be applied for balanced and unbalanced data structures. Leaf nodes can appear at different levels of the tree. The method builds the leaf nodes even if some of the leaf nodes are not at the same bottom level as the rest of the leaf nodes in the data structure when building the tree. In an embodiment, the build process is done by walking through the data structure, left-to-right, top-to-bottom, and level by level. At block 425, parent nodes that are non-leaf nodes are defined based on the data structure and added to the graphical tree. Child nodes are defined based on the data structure. If the child nodes are non-leaf nodes, then these child nodes are added to the graphical tree structure. At block 430, the child nodes are populated with metadata such as name and attributes. At block 435, the child nodes are attached to the parent nodes in the tree at a next level. At this point, it is most likely that the added non-leaf nodes exceed the maximum number of nodes per level.

At block 440, a check is performed to establish if the provided horizontal space is enough. This is done by computing if the current number of nodes per level exceeds the computed maximum number of nodes per level. If the window space is not enough in horizontal direction, then the process continues at block 445. At block 445, aggregation of the non-leaf nodes at this level is performed. Every two non-leaf nodes that share the same parent node are aggregated into one aggregation node. For example, aggregating non-leaf nodes 5 and 6 of FIG. 3A. If the two non-leaf nodes do not share the same parent node, they cannot be aggregated. For example, non-leaf nodes 7 and 8 of FIG. 3A. In this case, nodes 5 and 6 are aggregated into one node by combining their leaf nodes and node 7 remains the same. This is done for all non-leaf nodes at the particular level (e.g., level 3). Then, the process checks again if the window space is enough in horizontal direction after the aggregation. If it is not enough, the aggregation is repeated until the window space is enough to fit all non-leaf nodes of the level.

If the window space is enough horizontally, then the process continues at block 450. At block 450, sufficiency of the vertical space of the window is checked. This is done by computing if the current number of levels exceeds the computed maximum number of levels. If the window space is not enough in vertical direction, then the process continues at block 455. At block 455, the leaf nodes of the aggregation nodes are scaled down in accordance to the third step of the algorithm of FIG. 3C. Then, the process checks again if the window space is enough in vertical direction after the scaling. If it is not enough, the scaling is repeated until the window space is enough to fit all leaf nodes of the aggregation nodes.

If the window space is enough vertically, then the process continues at block 460. At block 460, the scaled leaf nodes are attached to the aggregation nodes of the graphical tree image. At block 465, the graphical tree is built in the provided window space. In this embodiment of the invention, the graphical image of the data structure is oriented vertically in the provided window space, starting from the root node at the top and ending with the leaf nodes at the bottom. It should be appreciated that in alternative embodiment, the graphical image (or visualization) of the data structure can be oriented horizontally in the provided window space. This means the root node of the tree will be located at the left side of the window and the leaf nodes will be at the right side of the window following a horizontal direction. Therefore, the horizontal orientation of the graphical tree will require first to check if the window space is enough vertically and then to check if the window space is enough horizontally.

The VHE 120 provides a single consolidated graphic that represents the entire tree hierarchy. No drilling in the data structure is required. The tool-tipping feature of the VHE provides a fast, non-committal, and safe mechanism to explore the hierarchy. The graphic itself is the "big picture" of the data structure. It shows the shape of the tree and can highlight certain branches of a tree that are balanced or unbalanced, sparse or dense. By visualizing the lowest-level leaf nodes in the graphic, the VHE 120 enables the user to see with a single glance where the leaf nodes are. Also, context information is always provided by the graphic.

Figure 5:
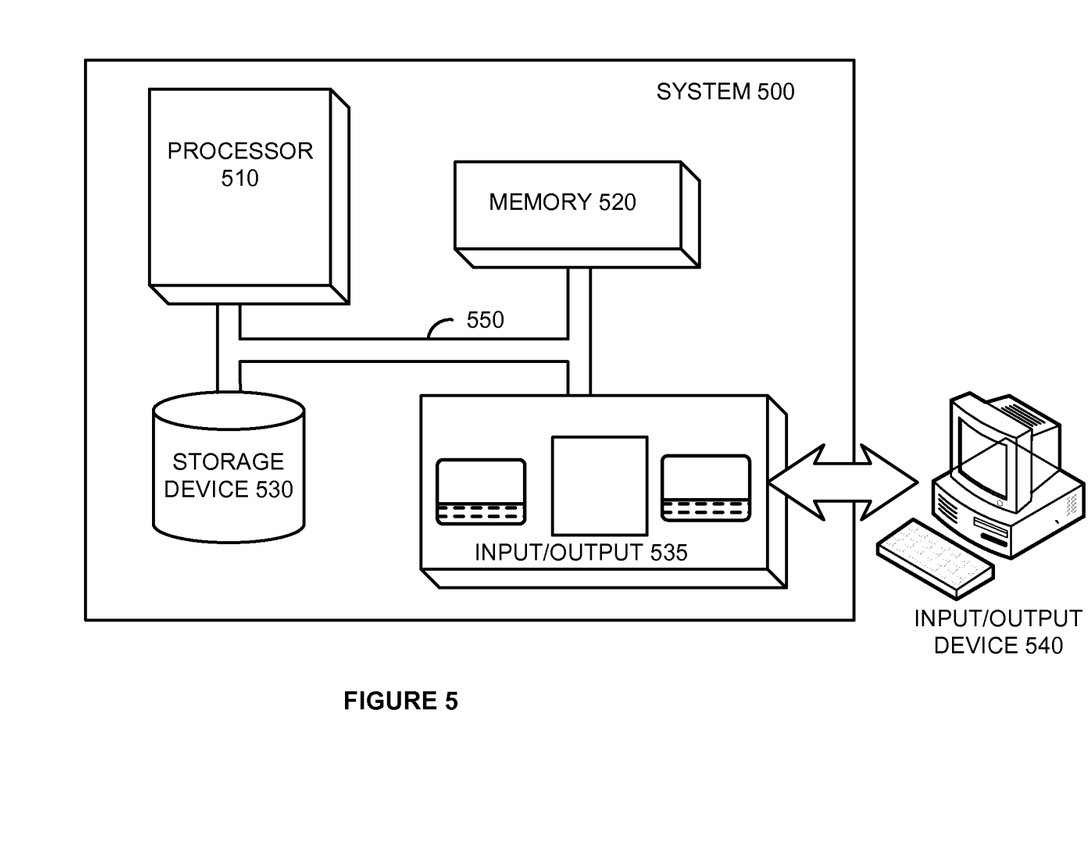
FIG. 5 is a schematic diagram of an example of a generic computer system.

FIG. 5 is a schematic diagram of an example of a generic computer system. Computer system 500 can be used for the operations described in association with the process 400 according to one implementation. System 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The storage device 530 is capable of providing mass storage for the system 500. The storage device 530 stores the hierarchal data structure 110 with the corresponding entities. In one implementation, the storage device 530 is a computer-readable medium. In various different implementations, the storage device 530 may be a floppy disk device, a hard disk device, an optical disk device, or a tape device.

The input/output device 540 provides input/output operations 535 for the system 500. In one implementation, the input/output device 540 includes a keyboard and/or pointing device. In another implementation, input/output device 540 includes a display unit for displaying graphical user interfaces such as the Visual Hierarchy Explorer 120.

Elements of embodiments may also be provided as a tangible machine-readable medium for tangibly storing the machine-executable instructions. The tangible machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program, which may be transferred from a remote computer (e.g., a server) to a requesting computer (e.g., a client) via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A computer-readable non-transitory storage medium having instructions therein that when executed by the machine, cause the machine to:
   receive a data structure including a plurality of levels, a root node, a plurality of non-leaf nodes, and a plurality of leaf nodes;
   build a graphical tree hierarchy associated with the data structure;
   horizontally aggregate at least a portion of the plurality of non-leaf nodes at an entire level of the graphical tree hierarchy to form a plurality of aggregation nodes, upon determining that a subset of the plurality of non-leaf nodes residing at the level exceeds a maximum number of nodes per the level;
   define a histogram plotted along a base of the graphical tree hierarchy comprising a set of bins correspondingly associated with the plurality of aggregation nodes, the plurality of leaf nodes defining a count for each bin of the histogram;
   upon determining that the plurality of levels of the graphical tree hierarchy exceeds a maximum number of levels, vertically scale down proportionally the plurality of leaf nodes in each bin of the histogram to a plurality of leaf node icons such that the plurality of leaf node icons fit in a predefined GUI region, wherein a leaf node icon of the plurality of leaf node icons represents a number of leaf nodes computed based on a maximum allowed number of leaf nodes in an aggregated node of the plurality of aggregation nodes and a number of leaf nodes in a largest aggregation node of the plurality of aggregation nodes; and
   display the graphical tree hierarchy in the predefined GUI region, the displayed graphical tree being associated with the data structure and accompanying metadata.

2. The computer-readable non-transitory storage medium of claim 1 having instructions that when executed further cause the machine to:
   compute the maximum number of levels of the graphical tree hierarchy that fit in the predefined GUI region based on a height parameter of the predefined GUI region; and
   compute the maximum number of nodes per the plurality of levels of the tree hierarchy that fit in the predefined GUI region based on a width parameter of the predefined GUI region.

3. The computer-readable non-transitory storage medium of claim 1, wherein instructions causing the machine to build the graphical tree hierarchy comprise instructions causing the machine to:
   add the root node to the graphical tree hierarchy at a first level of the plurality of levels; and
   walk through the data structure to build the plurality of non-leaf nodes of the graphical tree hierarchy.

4. The computer-readable non-transitory storage medium of claim 3 having instructions that when executed further cause the machine to:
   add a plurality of parent non-leaf nodes at different levels of the graphical tree hierarchy in accordance with the plurality of non-leaf nodes built by walking through the data structure;
   add a plurality of child non-leaf nodes to the graphical tree hierarchy in accordance with the plurality of non-leaf nodes built by walking through the data structure; and
   attach the plurality of child non-leaf nodes to the plurality of parent non-leaf nodes at lower levels of the graphical tree hierarchy in accordance with the walked-through data structure.

5. The computer-readable non-transitory storage medium of claim 1, wherein instructions causing the machine to aggregate at least a portion of the plurality of non-leaf nodes comprise instructions causing the machine to aggregate every two non-leaf nodes from the subset of the plurality of non-leaf nodes residing at the level that exceeds the maximum number of nodes per the level, the two non-leaf nodes sharing a same parent non-leaf node.

6. The computer-readable non-transitory storage medium of claim 5, wherein instructions causing the machine to scale down the plurality of leaf nodes comprise instructions causing the machine to:
   compute a maximum number of leaf nodes per an aggregation node based on a remaining portion of space of the predefined GUI region;
   retrieve a largest aggregation node at the level, the largest aggregation node including a maximum count of leaf nodes from the plurality of leaf nodes; and
   divide the retrieved maximum count of leaf nodes of the largest aggregation node by the computed maximum number of leaf nodes per the aggregation node.

7. The computer-readable non-transitory storage medium of claim 6 having instructions that when executed further cause the machine to:
   round up a result of the division of the maximum count of leaf nodes by the computed maximum number of leaf nodes per the aggregation node to a nearest whole number, if the result is not a whole number; and
   scale down the plurality of leaf nodes by the whole number.

8. The computer-readable non-transitory storage medium of claim 1 having instructions that when executed further cause the machine to:
   navigate in the displayed graphical tree hierarchy via a set of GUI elements;
   display metadata associated with an aggregation node in the graphical tree hierarchy upon user interaction with the aggregation node, wherein the metadata includes at least a portion of:
   a name of the aggregation node, a starting name and an ending name for the nodes aggregated in the aggregation node, a number of child nodes to the aggregation node, and a number of leaf nodes under the aggregation node; and
   switch orientation of the graphical tree hierarchy.

9. The computer-readable non-transitory storage medium of claim 1 having instructions that when executed further cause the machine to:
   receive a selection of a node in the predefined GUI region, the node representing a portion of the graphical tree hierarchy; and
   update the predefined GUI region to include a sub-tree defined by the node, thereby drilling into a subset of the graphical tree hierarchy.

10. The computer-readable non-transitory storage medium of claim 1 having instructions that when executed further cause the machine to:
    receive a user interaction to drill out of the graphical tree hierarchy; and
    in response to the user interaction, update the predefined GUI region to include a subset of the graphical tree hierarchy corresponding to the drill out.

11. The computer-readable non-transitory storage medium of claim 1, wherein the count for each bin of the histogram is represented by a visual element selected from:
    a set of icons, wherein a first number of leaf nodes is equated to a representative icon in the set of icons; and
    a bar, wherein the length of a representative bar is proportional to the count for a representative bin.

12. A computer implemented method for displaying a tree structure hierarchy on a computer generated user interface, the method comprising:
    receiving a data structure including a plurality of levels, wherein the graphical tree hierarchy includes at least a root node, a plurality of non-leaf nodes, and a plurality of leaf nodes, and wherein the data structure is stored in a database storage unit;
    horizontally aggregating at least a portion of the plurality of non-leaf nodes at an entire level of the graphical tree hierarchy to form a plurality of aggregation nodes upon determining that a subset of the plurality of non-leaf nodes residing at the level exceeds a maximum number of nodes per the level;
    defining a histogram plotted along a base of the graphical tree hierarchy comprising a set of bins correspondingly associated with the plurality of aggregation nodes, and the plurality of leaf nodes defining a count for each bin of the histogram;
    upon determining that the plurality of levels of the graphical tree hierarchy exceeds a maximum number of levels, vertically scaling down proportionally the plurality of leaf nodes in each bin of the histogram to a plurality of leaf node icons such that the plurality of leaf node icons fit in a predefined GUI region, wherein a leaf node icon of the plurality of leaf node icons represents a number of leaf nodes computed based on a maximum allowed number of leaf nodes in an aggregated node of the plurality of aggregation nodes and a number of leaf nodes in a largest aggregation node of the plurality of aggregation nodes; and
    displaying the graphical tree hierarchy as a visualization in the predefined GUI region, the displayed graphical tree associated with the data structure and accompanying metadata.

13. The method of claim 12 further comprising:
    computing the maximum number of levels of the graphical tree hierarchy that fit in the predefined GUI region based on a height parameter of the predefined GUI region; and
    computing the maximum number of nodes per the plurality of levels of the tree hierarchy that fit in the predefined GUI region based on a width parameter of the predefined GUI region.

14. The method of claim 12, wherein receiving the graphical tree hierarchy comprises:
    adding the root node to the graphical tree hierarchy at a first level of the plurality of levels;
    adding a plurality of parent non-leaf nodes at different levels of the graphical tree hierarchy;
    adding a plurality of child non-leaf nodes to the graphical tree hierarchy by attaching the nodes of the plurality of child non-leaf nodes to their parents in the plurality of parent non-leaf nodes; and
    updating the visualization of the graphical tree.

15. The method of claim 12, further comprising:
    updating the visualization with metadata associated with an aggregation node in the graphical tree hierarchy upon user interaction with the aggregation node, wherein the metadata includes at least a portion of:
    a name of the aggregation node, a starting name and an ending name for the nodes aggregated in the aggregation node, a number of child nodes to the aggregation node, and a number of leaf nodes under the aggregation node.

16. The method of claim 12, wherein aggregating at least a portion of the plurality of non-leaf nodes comprises aggregating every two non-leaf nodes from the subset of the plurality of non-leaf nodes residing at the level that exceeds the maximum number of nodes per the level, where the two non-leaf nodes share a same parent non-leaf node.

17. The method of claim 12 further comprising:
- navigating in the displayed graphical tree hierarchy via a set of GUI elements;
- providing information for the graphical tree hierarchy and for each node of the graphical tree hierarchy; and
- switching orientation of the graphical tree hierarchy.

18. The method of claim 12, wherein the count for each bin of the histogram is represented by a visual element selected from:
- a set of icons, wherein a first number of leaf nodes is equated to a representative icon in the set of icons; and
- a bar, wherein the length of a representative bar is proportional to the count for a representative bin.

19. The method of claim 12 wherein the aggregating at least a portion of the plurality of non-leaf nodes at a level of the graphical tree hierarchy occurs, if a subset of the plurality of non-leaf nodes residing at the level exceeds a maximum number of nodes per the level.

20. The method of claim 19 further comprising:
- computing the maximum number of nodes per the plurality of levels of the tree hierarchy that fit in the predefined GUI region based on a width parameter of the predefined GUI region.

21. A computing system comprising:
- a processor;
- a memory device including instructions stored thereon that are operable on the processor to cause the system to provide:
- a GUI region with predefined parameters;
- a hierarchal data structure stored in a database storage unit;
- a graphical tree structure with a plurality of hierarchal levels including at least a root node, a plurality of non-leaf nodes, and a plurality of leaf nodes,
  - wherein at least a portion of the plurality of non-leaf nodes is aggregated horizontally, to form a plurality of aggregation nodes, when a subset of the plurality of non-leaf nodes residing at a level of the tree exceeds a maximum number of non-leaf nodes per that level,
  - wherein a histogram is plotted along a base of the graphical tree hierarchy comprising a set of bins correspondingly associated with the plurality of aggregation nodes, the plurality of leaf nodes defining a count for each bin of the histogram, and
  - wherein the plurality of leaf nodes is vertically scaled down proportionally in each bin of the histogram to a plurality of leaf node icons such that the plurality of leaf node icons fit in a predefined GUI region, wherein a leaf node icon of the plurality of leaf node icons represents a number of leaf nodes computed based on a maximum allowed number of leaf nodes in an aggregated node of the plurality of aggregation nodes and number of leaf nodes in a largest aggregation node of the plurality of aggregation nodes, when the levels of the tree exceed a maximum number of levels, and wherein the graphical tree is a visual representation of the hierarchal data structure displayed in the predefined GUI region; and
- a set of GUI elements to navigate in the graphical tree structure and to retrieve information about the root node, the plurality of non-leaf nodes, and the plurality of leaf nodes.

22. The computing system of claim 21, wherein the set of GUI elements to navigate in the graphical tree structure comprises:
- a zoom button to zoom an aggregation node of the graphical tree structure, wherein after zooming in, a parent node of the aggregation node becomes the root node and a sub-tree of the graphical tree residing under the parent node is rendered;
- an orientation change button that changes orientation of display of the graphical tree structure; and
- a select button to select a node or multiple nodes of the graphical tree structure.

23. The computing system of claim 21, wherein the set of GUI elements to retrieve information in the graphical tree structure comprises:
- a scale GUI component that displays a number of actual leaf nodes that are represented by a leaf node of the plurality of leaf nodes;
- a total items GUI component that displays a total number of nodes in the graphical tree structure; and
- a tooltip GUI component that displays information about each node in the graphical tree structure.

\* \* \* \* \*